Aug. 29, 1967  J. M. SHEESLEY  3,338,140
ACTUATOR

Filed Aug. 16, 1965  5 Sheets-Sheet 1

John M. Sheesley
INVENTOR.

BY

ATTORNEY

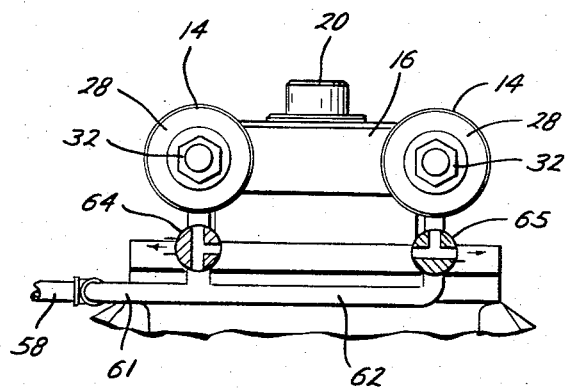
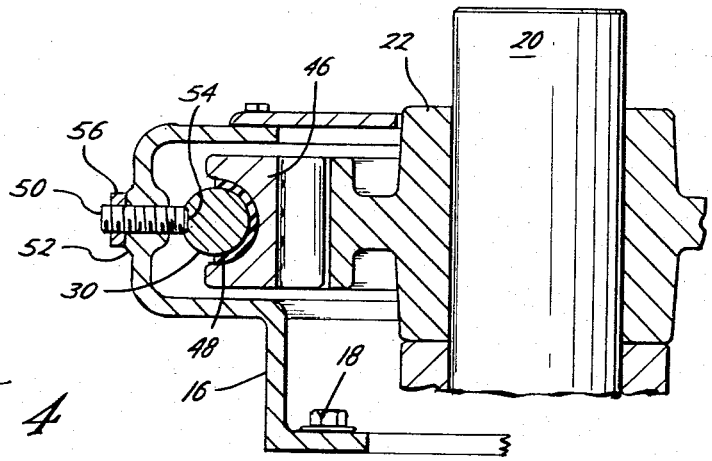

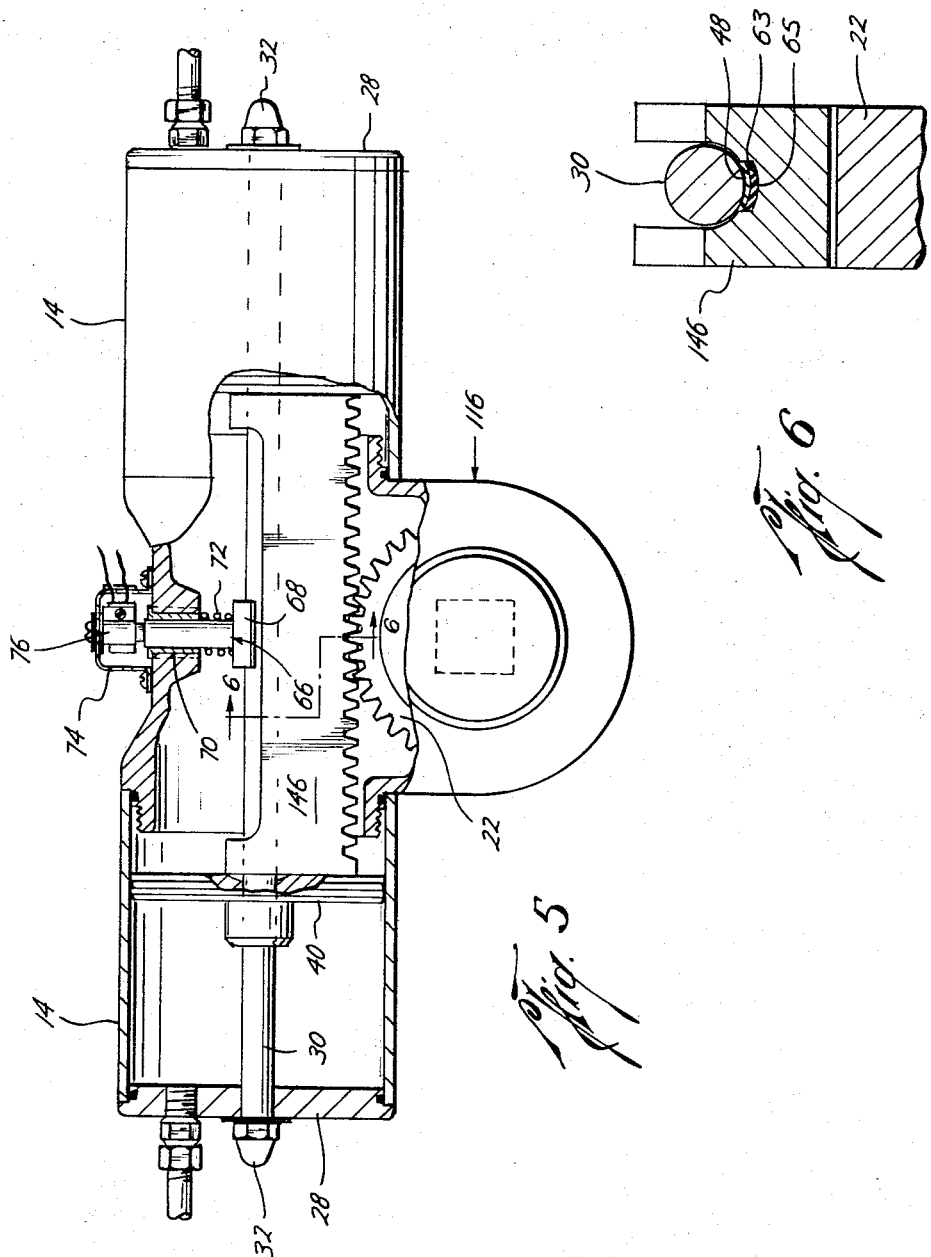

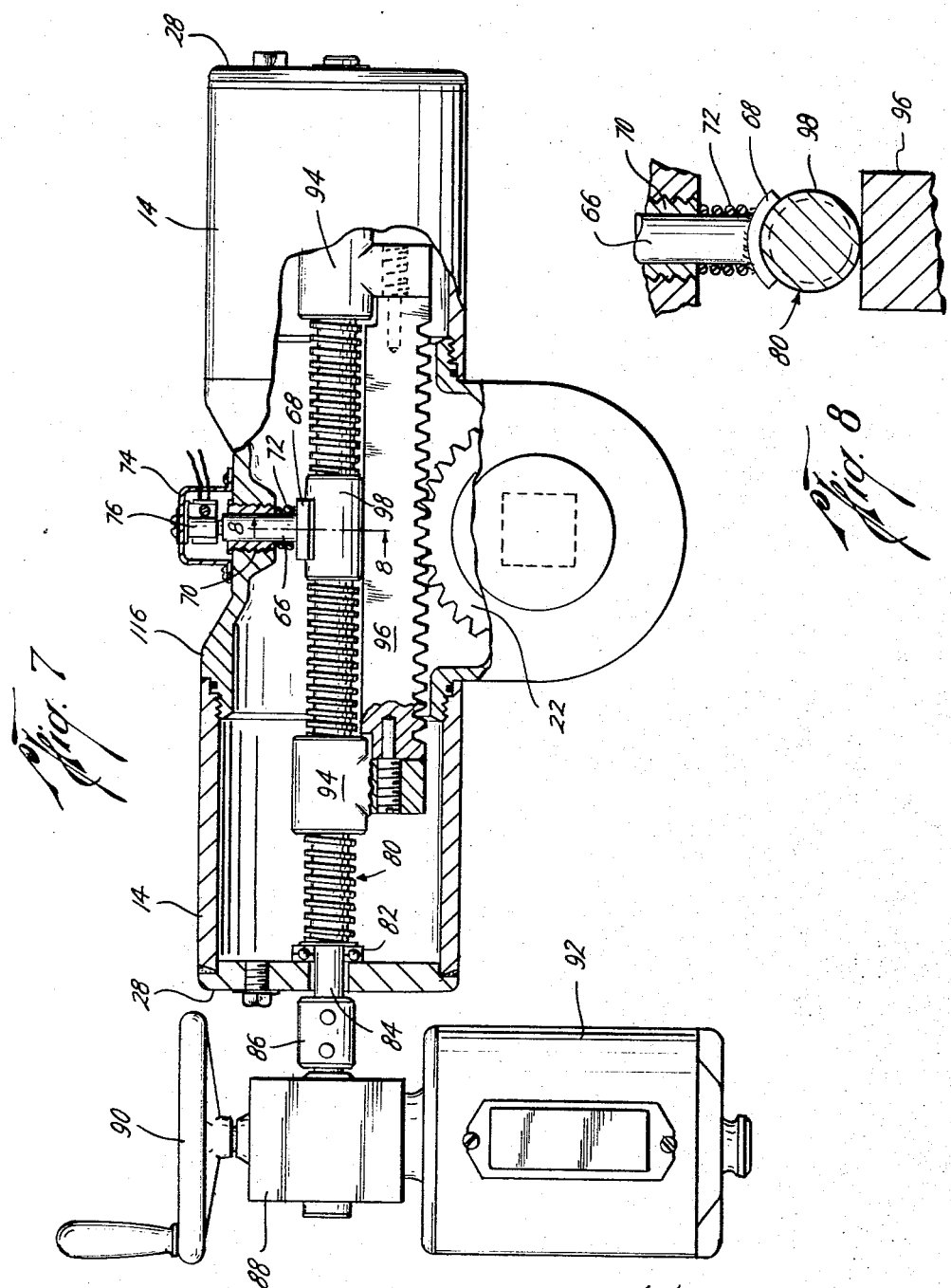

Aug. 29, 1967  J. M. SHEESLEY  3,338,140
ACTUATOR
Filed Aug. 16, 1965  5 Sheets-Sheet 5
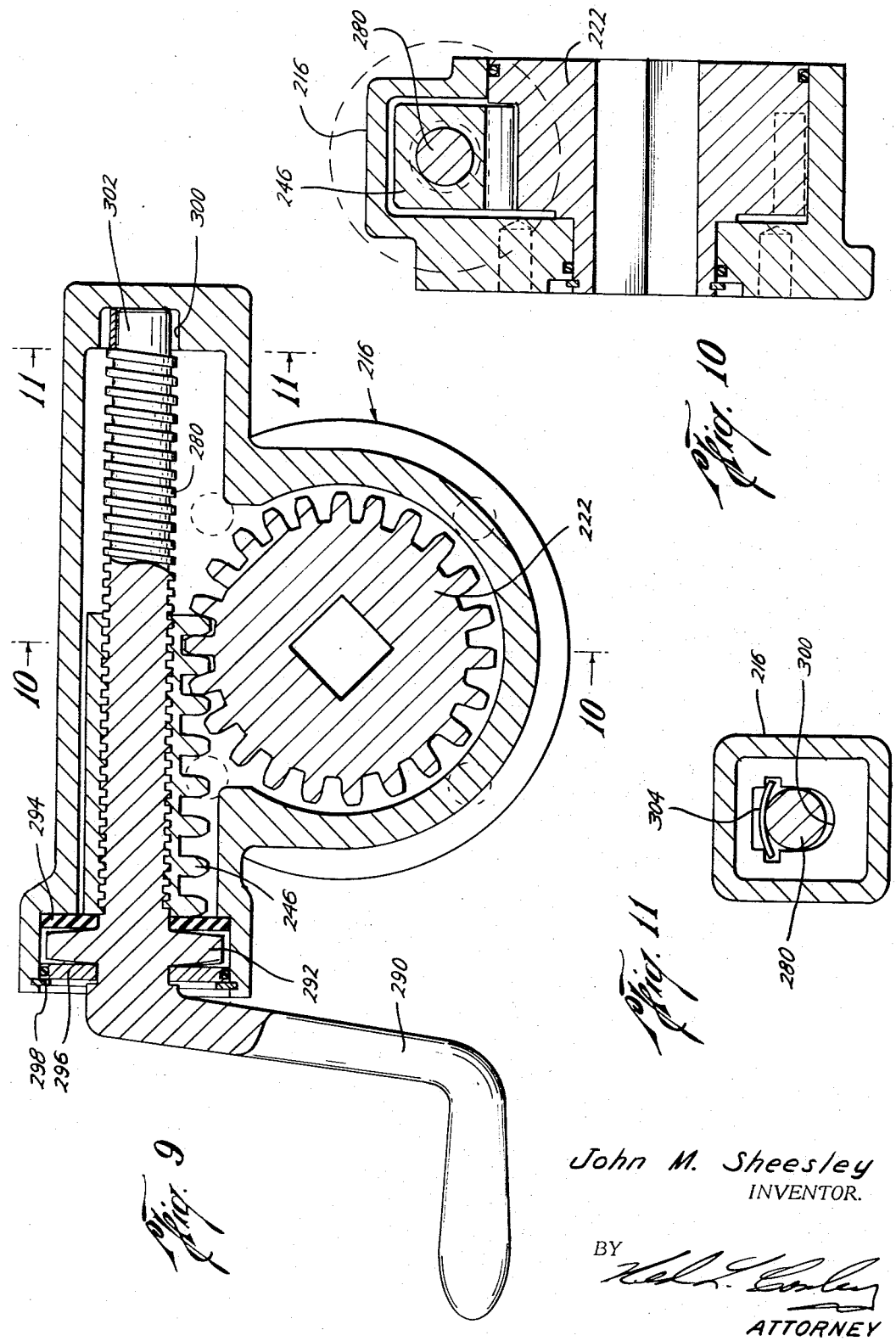
John M. Sheesley
INVENTOR.
BY
ATTORNEY

United States Patent Office 3,338,140
Patented Aug. 29, 1967

3,338,140
ACTUATOR
John M. Sheesley, P.O. Box 9365, Houston, Tex. 77001
Filed Aug. 16, 1965, Ser. No. 480,057
20 Claims. (Cl. 92—5)

This invention relates to fluid operated means for converting longitudinal movement to rotary movement, and more particularly it relates to improvements in fluid operated actuators for actuating plug valves and the like, and this application is a continuation-in-part of my copending application Ser. No. 400,454, filed Sept. 30, 1964, entitled Actuation, now abandoned.

It is well known in the art to provide air or hydraulic actuators for operating plug valves and the like which are operated usually by about a 90° turn of the valve stem. Such an actuator is shown for example in my Patent No. 3,104,592, issued Sept. 24, 1963. Such fluid operated actuators are also used for many other purposes, as shown for example in U.S. Patents Numbers 2,265,842 to Kellog; 2,269,382 to Schmidt; 1,957,697 to Conway; 3,040,717 to Rumsey, and 3,064,628 to Canalizo et al.; and in British Patent No. 838,647 to Cross.

As seen in these patents, such actuators usually comprise a fluid operated piston which is moved longitudinally by fluid pressure, and which is connected to a rotatable element by means which convert the longitudinal movement of the piston to rotary movement of the element about an axis transverse to the direction of movement of the piston. This element is connected to the stem of the valve to rotate the valve. The larger sizes of such actuators in particular, such as those used to operate large pipeline valves, require high fluid pressures to exert the force necessary to rotate the valves. It will be appreciated that although the major component of the force transmitted from the piston to the rotatable element is tangent to the rotatable element and longitudinally of the piston movement, there is also necessarily a force component which is radial to the axis of rotation of the rotatable element and transverse to the direction of movement of the piston. According to one embodiment of the present invention means are provided to absorb this radial component to prevent its being exerted on the piston and thereby prevent transverse loading and eccentric wear on the flange of the piston and in the bore of the cylinder in which it operates.

In another embodiment of the invention the radial force component is utilized to actuate a switch to stop the operation of the actuator. This embodiment is particularly useful where applied to electrically powered actuators wherein a jackscrew is utilized rather than the piston that is used in the air and hydraulically powered actuators to obtain longitudinal movement.

In still another embodiment of the invention resilient means are provided to remove any slack or backlash between the longitudinally moving elements and the rotary moving elements.

Accordingly it is an object of this invention to provide means by which the piston in an actuator is isolated from any transverse loading in the actuator mechanism. Another object of the invention is to provide means in an actuator wherein stationary elements absorb forces perpendicular to the direction of movement of the piston so as to prevent the application of any bending moment to the piston or to any other longitudinally movable element in the apparatus. Still another object of the invention is to provide an actuator which includes a rack and gear mechanism wherein means are provided for eliminating any backlash between the rack and gear teeth. Yet another object of the invention is to provide an actuator for converting longitudinal movement to rotary movement wherein forces which are radial to the rotating elements are utilized to actuate the switch to stop the operation of the actuator.

The accomplishment of these and other objects of the invention will become more apparent upon a consideration of the following description and of the accompanying drawings, wherein:

FIGURE 3 is a fragmentary view of a portion of the structure shown in FIGURE 1, taken at line 3—3 of FIGURE 1;

FIGURE 4 is a fragmentary vertical sectional view of a portion of the embodiment of FIGURES 1, 2 and 3, taken at line 4—4 of FIGURE 2;

FIGURE 5 is a plan view, partly in section of another embodiment of the invention;

FIGURE 6 is a fragmentary sectional view of a portion of the embodiment shown in FIGURE 5, taken at line 6—6 of FIGURE 5;

FIGURE 7 is a plan view, partly in section, of still another embodiment of the invention;

FIGURE 8 is a fragmentary sectional view of a portion of the embodiment shown in FIGURE 7, taken at line 8—8 of FIGURE 7;

FIGURE 9 is a plan view, partly in section of still another embodiment of the invention;

FIGURE 10 is a vertical sectional view of the embodiment of FIGURE 9, taken at line 10—10 of FIGURE 9; and FIGURE 11 is a vertical sectional view of the embodiment of FIGURE 9, taken at line 11—11 of FIGURE 9.

Figure 1:
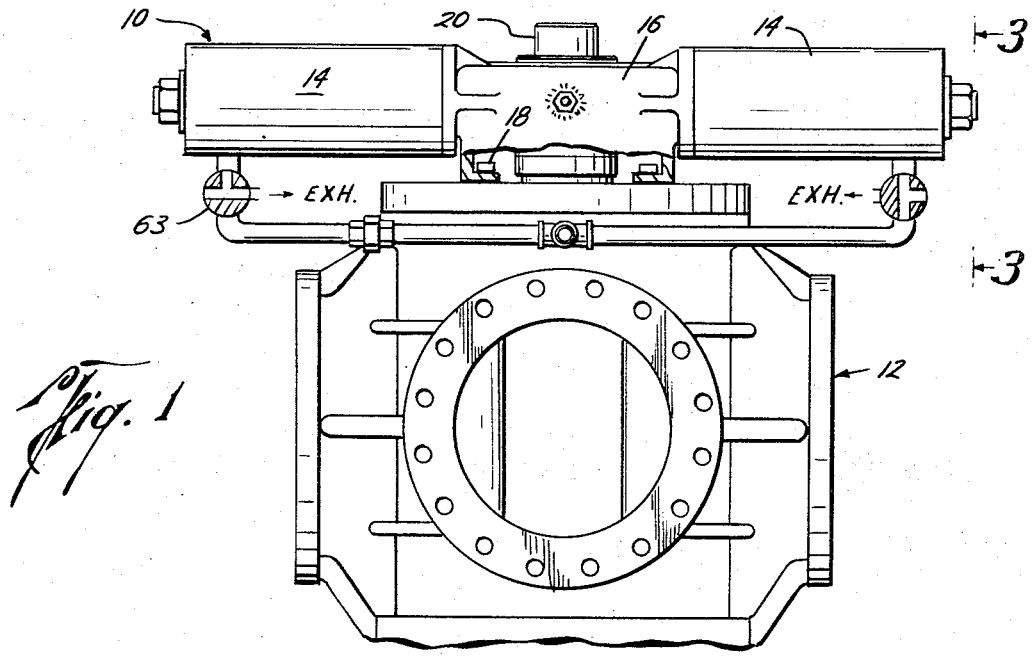
FIGURE 1 is an elevational view of one embodiment of the invention shown attached to a valve.
Figure 2:
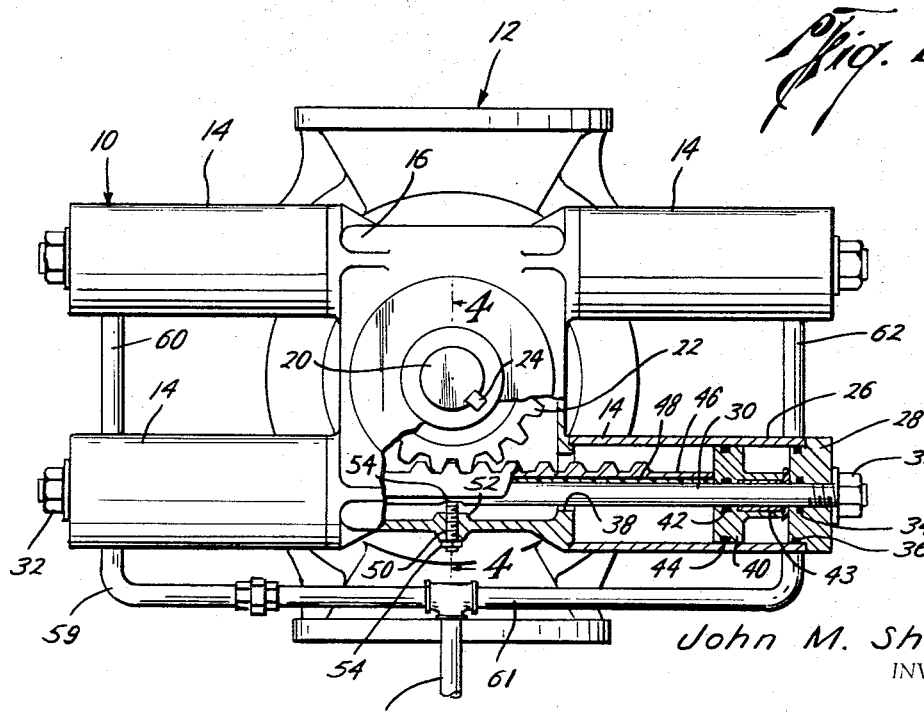
FIGURE 2 is a plan view of the embodiment shown in FIGURE 1 with parts shown in section.

In FIGURES 1 and 2 of the drawing an actuator is shown mounted on a plug valve. As seen in these two figures, the actuator comprises four fluid cylinders 14 and a main frame member 16 on which the fluid cylinders are mounted. The main frame member 16 is attached to the valve as by means of the bolts 18. The stem 20 of the plug valve 12 extends through a suitable opening in the main frame member 16. Within the main frame member a pinion 22 is suitably fastened to the stem for rotation therewith, as by means of key 24.

In the embodiment shown the cylinder housings 14 are aligned in pairs on opposite sides of the stem 20. Each of the cylinder housings 14 comprises a tubular member 26 and a cylinder head 28. A guide rod 30 extends axially through the aligned pair of cylinders 14 on each side of the actuator and is provided with nuts 32 on each end, outside the cylinder heads, for the purpose of drawing the cylinder heads tightly against the ends of the tubular members 26 and holding the assembly together. A fluid tight seal is maintained at the end of each cylinder by means of O-rings 34 and 36. The guide rod extends through apertures 38 provided in a portion of the main frame member which forms the inner end of each cylinder 14. A piston body 40 is slidably received upon the guide rod within each of the cylinders 14 and sealingly engages the tubular member 26 and the guide rod 30, seal members 42, 43 and 44 being provided to prevent leakage of fluid pressure past the piston. Between the piston bodies 40 on guide rod 30 a rack 46 is slidably received. The rack is held between and moves with the piston bodies 40 and its teeth operably engage the teeth of the pinion 22. As best seen in FIGURE 4, the side of the rack which engages the guide rod 30 is semi-cylindrical in form so that the rack engages less than all of the circumference of the guide rod. A semi-cylindrical bearing member 48 is provided intermediate the rack and the guide rod so as to facilitate the sliding movement of the rack on the guide rod.

It is apparent that the engagement of the rack teeth with the teeth of the pinion 22 will create a force at the point of engagement which has components both longitudinally of the rack (and tangentially of the pinion) as well as transversely of the rack (and radially of the pinion). Such transverse or radial force component necessarily tends to apply a bending moment to the guide rod 30, which bending moment would normally be transmitted to the piston bodies 40. To avoid the transmission of such bending moment to the piston bodies the present invention provides means for absorbing the transverse or radial force component. Such means comprises, in the embodiment shown, a threaded member such as a stud 50 which is threadedly engaged in a boss 52 formed in the main frame 16, the threaded member extending substantially radially of the pinion and transversely of the rack and being positioned substantially in alignment with the radial or transverse force component created between the rack and pinion. The stud 50 engages a flat 54 formed on the side of the guide rod 30 for that purpose and the stud is held in such position and prevented from accidental movement by a lock nut 56.

The actuator of this embodiment of the invention is operated in the usual manner by air or hydraulic pressure fluid applied through fluid conduits 58, 59, 60, 61 and 62. Three-way valves, such as the valves 63, 64 and 65 shown in FIGURES 1 and 3, are used to direct fluid flow as required to operate the fluid cylinders. It will be apparent that the fluid flow is directed so that, for example, the pistons in the two upper fluid cylinders 14 of FIGURE 2 are moved to the right, while the pistons in the two lower fluid cylinders in FIGURE 2 are moved to the left, and vice versa. Thus in the embodiment shown two fluid cylinders are utilized to move the valve from open to closed and two other fluid cylinders are utilized to move the valve from closed to open. Where lesser loads are encountered or higher fluid pressures are used, a single cylinder may be utilized for movement in each direction, or a single double-acting cylinder may be used for both opening and closing the valve.

It is apparent that, by this embodiment of the invention, means have been provided to absorb all radial or transverse loading on the longitudinally movable elements of the actuator of this invention. The threaded member 50 utilized for this purpose can also be adjusted to accommodate any wear that may take place in any of the rack, the bearing, or the guide rod 30.

The embodiment of the invention shown in FIGURES 5 and 6 utilizes actuator structure basically similar to that of the embodiment of FIGURES 1–4 except that in this embodiment only two fluid cylinders 14 are used. Thus the main frame member 116 shown in FIGURE 5 only has provision for mounting the two fluid cylinders and for enclosing the pinion 22. Other elements in the FIGURE 5 embodiment which are the same or substantially the same as elements of the embodiment of FIGURES 1–4 are identified by the same reference numerals. As in the previous embodiment a bearing member 48 is provided intermediate the guide rod 30 and the rack 146 to facilitate sliding movement of the rack on the guide rod. However in this embodiment a longitudinally extending groove 63 is formed in the rack below the bearing material and resilient means 65 are placed in said groove to resiliently bias the rack away from the guide bar so as to hold the teeth of the rack in close engagement with the teeth of the pinion 22. Such resilient means may comprise natural or synthetic rubber or other resilient material or may comprise a series of leaf springs or the like. The use of such resilient means maintains constant tooth contact and avoids backlash.

In place of the stud 50 which absorbs radial loading on the guide rod in the previous embodiment, the present embodiment utilizes a plunger 66 which has a flanged end 68 with a concave arcuate face engaging the guide rod 30. A bushing 70 is threadedly secured in the frame or housing member 116 and slidably receives and guides the plunger in a position extending radially of the pinion 22. A spring 72 between the bushing 70 and the flanged end 68 resiliently biases the plunger into engagement with the guide rod on the opposite side from the rack 146. Fastened to the outside of the frame member 116 and covering the outer end of the plunger 66 is a switch housing 74 which encloses a switch 76 of the microswitch type which is actuable by a very short longitudinal movement of the plunger, i.e. of the nature of only a few thousandths of an inch. This switch is connected, in a manner well known in the art but not shown herein, to means controlling the flow of fluid into the cylinders 14, so that upon actuation of the switch flow of fluid to the cylinder is cut off and movement of the rack and pinion is stopped.

The embodiment shown in FIGURES 7 and 8 may be driven by an electric motor or manually by means of a hand wheel. The structure of the main frame member or housing 116 and of the cylinders 14 may be substantially identical to that of the embodiment of FIGURES 5 and 6. Of course in this embodiment the cylinders 14 do not act as fluid cylinders but merely as a part of the housing for containing the elements of the mechanism. Thus a jackscrew 80 extends longitudinally of the housing formed by the cylinders 14 and the frame 116 and is mounted in bearings 82 at each end. The jackscrew has a smooth cylindrical extension 84 extending out one end through the cylinder head 28 for mounting of a coupling 86. The output shaft of the gear box 88 is also attached to this coupling. The gear box has two input shafts, one of which may be driven by handwheel 90 and the other by an electric motor 92.

Two nuts 94 are threadedly received at longitudinally spaced apart points on the jackscrew and are adapted to be attached to either end of the rack 96. Thus the rack 96 extends longitudinally of and parallel to the center portion of the jackscrew. As in the previous embodiments the rack engages a pinion 22. At the center point of the jackscrew a smooth cylindrical portion 98 is provided on the opposite side of the rack from the point of engagement of the rack within the pinion 22. As in the embodiments of FIGURES 5 and 6 a resiliently biased plunger 66 engages the cylindrical portion 98 of the jackscrew on the side opposite the rack. The smooth cylindrical portion 98 of the jackscrew thus is engaged by the flange 68 of the plunger and in turn engages the back surface of the rack 96 so that the spring 72 on the plunger is compressed and the plunger is moved vertically whenever any movement of the rack radially to the pinion occurs.

The switch 76 in this embodiment is connected, by means well known in the art, through a relay to the motor 92 to shut off the power to the jackscrew whenever radial forces resulting from the engagement of the rack with the pinion cause the rack to move radially away from the center of the pinion.

Another embodiment of the invention wherein the backlash or slack in the operating mechanism is eliminated is shown in FIGURES 9, 10 and 11. In this embodiment a main frame member or housing 216 provides means for rotatably mounting therein a pinion 222. The teeth on the pinion are engaged by corresponding teeth on a rack member 246 which is carried on and engaged with the threads of a jackscrew 280. The jackscrew is rotated by means of a crank 290, although it may, of course, be rotated by an electric motor or other rotatable power source similarly as the embodiment of FIGURE 7. A collar 292 is formed near the end of the jackscrew adjacent the crank and fits between thrust bearing members 294 and 296. The thrust bearing member 296 is held in place as by means of a snap ring 298. The opposite end 302 of the jackscrew is not threaded but is cylindrical in shape and is received within a cavity 300 formed in the main frame member. A leaf spring 304 fitted within the cavity 300 biases the jackscrew toward the pinion 222.

In this embodiment of the invention the leaf spring 304 holds the teeth of the rack 246 tightly in engagement with the teeth of the pinion 222 so that the inherent backlash or looseness of the gear teeth will be eliminated. Thus, when the crank is operated so as to rotate the jackscrew in one direction and then in the other direction, therefore, causing a rotation of the pinion, there will be no lost motion upon reversal of direction. This design also will maintain this condition of elimination of backlash even after the gear teeth are worn, since space is provided in the cavity 300 for movement of the jackscrew 280, and therefore of the rack 246, radially toward the pinion 222.

Such elimination of looseness or backlash becomes extremely important where the actuators of this invention are used to operate butterfly valves, for example, since any looseness in the operating mechanism might allow flutter of a partially open butterfly valve. Such elimination of backlash and looseness is also important where the actuator is used to operate metering or proportioning valves since extremely accurate setting of such valves is impossible where the usual backlash conditions prevail.

Although preferred embodiments of the invention have been shown and described herein, many modifications thereof will be apparent to those skilled in the art and therefore the invention is not limited solely to the embodiments shown and described but only as set forth by the following claims:

1. In a device for converting longitudinal movement to rotary movement, comprising
a longitudinally movable piston which slides on a guide rod,
a rotatable element disposed transversely of said guide rod,
and mechanism connecting said piston and said rotatable element adapted to convert longitudinal movement of said piston to rotary movement of said rotatable element, whereby at the point of conversion a force component is transverse to the direction of said longitudinal movement, said mechanism at least partially encompassing said guide rod,
the improvement which comprises means engaging said rod positioned to absorb said transverse force and prevent the application of a bending moment to said rod.

2. A device as defined by claim 1 wherein the last-named means is adjustable to compensate for wear.

3. A device as defined by claim 1 wherein the last-named means comprises a threaded member extending radially of the axis of rotation of said rotatable element, and having an end engaging the rod on the side thereof opposite to said rotatable element.

4. A device for converting longitudinal movement to rotary movement comprising
a housing,
a fixed guide rod extending longitudinally of said housing,
a piston longitudinally slidably disposed within said housing and on said guide rod,
an element disposed in said housing adapted to be rotated about an axis extending transversely of said guide rod,
means for applying fluid under pressure to said piston to cause it to move longitudinally of said guide rod,
mechanism connecting said piston and said element adapted to convert longitudinal movement of said piston to rotary movement of said element, whereby at the point of conversion a force component is transverse to the direction of said longitudinal movement, said mechanism at least partially encompassing said guide rod,
and means engaging said rod positioned to absorb said transverse force and prevent the application of a bending moment to said rod.

5. A device as defined by claim 4 wherein the last-named means is adjustable to compensate for wear.

6. A device as defined by claim 4 wherein the last-named means comprises a threaded member extending radially of the axis of rotation of said element and having an end engaging the rod on the side thereof opposite to said element.

7. A device for converting longitudinal movement to rotary movement comprising
a housing,
a fixed guide rod extending longitudinally of said housing,
a piston longitudinally slidably disposed within said housing and on said guide rod,
an element disposed in said housing adapted to be rotated about an axis extending transversely of said guide rod,
means for applying fluid under pressure to said piston to cause it to move longitudinally of said guide rod,
mechanism connecting said piston and said element adapted to convert longitudinal movement of said piston to rotary movement of said element, said mechanism at least partially encompassing said guide rod,
said mechanism including power transmission means movable with said piston and slidable on said guide rod and said element, through which the force of the piston is transmitted to the element,
and means bearing on the opposite side of the guide rod to absorb transverse force components.

8. A device as defined by claim 7 wherein the last-named means comprises a threaded member extending radially of said shaft and having an end engaging the rod on the side thereof opposite to said element.

9. A device for converting longitudinal movement to rotary movement comprising
a housing,
a fixed guide rod extending longitudinally of said housing,
a piston longitudinally slidably disposed within said housing and on said guide rod,
a pinion rotatably disposed in said housing adapted to be rotated about an axis extending transversely of said guide rod,
means for applying fluid under pressure to said piston to cause it to move longitudinally of said guide rod,
a rack movable with said piston and slidably engaged with said guide rod between said guide rod and said pinion and in engagement with said pinion whereby longitudinal movement of said rack applies a force to said pinion to cause it to rotate,
and a threaded member extending radially of said pinion and having an end engaging the rod on the side thereof opposite to said rack to absorb transverse force components.

10. A motion conversion apparatus comprising
a rod member,
a first element engaging said rod member and adapted to be moved longitudinally thereof,
a second rotatable element engaged by said first element and adapted to be rotated, upon longitudinaly movement of said first element, about an axis transverse to the direction of movement of the first element, whereby a force component is created which is radial to the rotatable element and transverse to the direction of said longitudinal movement, and
means engaging and at least partially encompassing said rod member positioned to absorb at least a part of said transverse force and reduce the bending moment applied to the rod member.

11. Apparatus as defined by claim 10 wherein the last-named means is adjustable to compensate for wear.

12. Apparatus as defined by claim 10 wherein the last-named means comprises a threaded member extending radially of said rotatable member and having an end engaging the rod member on the side thereof opposite to said rotatable member.

13. Apparatus as defined by claim 10 wherein
said rod member comprises a jackscrew, and
said first element comprises a rack which moves longitudinally when the jackscrew is rotated.

14. Apparatus as defined by claim 10 wherein the last-named means is resiliently biased into engagement with the rod member.

15. Apparatus as defined by claim 14 and including means actuable by the movement of said last-named means to cause cessation of longitudinal movement of said first element.

16. Apparatus as defined by claim 9 and including means resiliently biasing said rack radially toward said pinion.

17. Apparatus as defined by claim 16 wherein said resilient biasing means is intermediate said rack and said guide rod.

18. A device for converting longitudinal movement to rotary movement comprising
a housing,
a fixed guide rod extending longitudinally of said housing,
a piston longitudinally slidably disposed within said housing and on said guide rod,
a pinion rotatably disposed in said housing adapted to be rotated about an axis extending transversely of said guide rod,
means for applying fluid under pressure to said piston to cause it to move longitudinally of said guide rod,
a rack movable with said piston and slidable on said guide rod between said guide rod and said pinion and in engagement with said pinion whereby longitudinal movement of said rack applies a force to said pinion to cause it to rotate, and
means resiliently biasing said rack radially toward said pinion.

19. A device for converting longitudinal movement to rotary movement comprising
a housing,
a fixed guide rod extending longitudinally of said housing,
a piston longitudinally slidably disposed within said housing and on said guide rod,
a pinion rotatably disposed in said housing adapted to be rotated about an axis extending transversely of said guide rod,
means for applying fluid under pressure to said piston to cause it to move longitudinally of said guide rod,
a rack at least partially encompassing said guide rod, movable with said piston and slidable on said guide rod between said guide rod and said pinion and in engagement with said pinion whereby longitudinal movement of said rack applies a force to said pinion to cause it to rotate,
a spring-biased plunger extending radially of said pinion and having an end engaging the rod on the side thereof opposite to said rack,
and means actuable by the movement of said plunger away from said pinion to cause cessation of the flow of fluid to said piston.

20. A motion conversion apparatus comprising
a housing,
a jackscrew extending longitudinally of said housing,
means conected to one end of said packscrew adapted to cause it to rotate,
a non-rotatable rack threadedly engaged on said jackscrew and extending longitudinally thereof,
a pinion rotatably disposed in said housing and adapted to be rotated about an axis extending transversely of said jackscrew and engaging said rack, whereby rotation causes rotation of said pinion,
a spring-biased plunger extending radially of said pinion and having an end at least partially encompassing and engaging the jackscrew on the side thereof opposite to said pinion,
and means actuable by the movement of said plunger away from said pinion, to cause cessation of the rotation of said jackscrew.

References Cited

UNITED STATES PATENTS

| | | | |
|---|---|---|---|
| 899,795 | 9/1908 | Osmer | 92—136 X |
| 1,843,347 | 2/1932 | Steelsmith | 74—422 X |
| 2,168,215 | 8/1939 | Keitel | 92—136 X |
| 2,223,702 | 12/1940 | Penick et al. | 251—250 X |
| 2,467,066 | 4/1949 | Wilson | 74—422 X |
| 2,788,424 | 4/1957 | Huelskamp et al. | 74—89 X |
| 2,833,510 | 5/1958 | Allen et al. | 251—250 X |
| 2,847,868 | 8/1958 | Newman | 92—138 X |
| 2,963,260 | 12/1960 | Siravo | 251—250 X |
| 3,109,317 | 11/1963 | Cousino et al. | 74—411 |
| 3,151,533 | 10/1964 | Hartel | 92—136 X |

MARTIN P. SCHWADRON, *Primary Examiner.*

EDGAR W. GEOGHEGAN, *Examiner.*

I. C. COHEN, *Assistant Examiner.*